Dec. 1, 1936. J. M. WITHEY 2,062,386
FISH STRINGER
Filed May 4, 1936
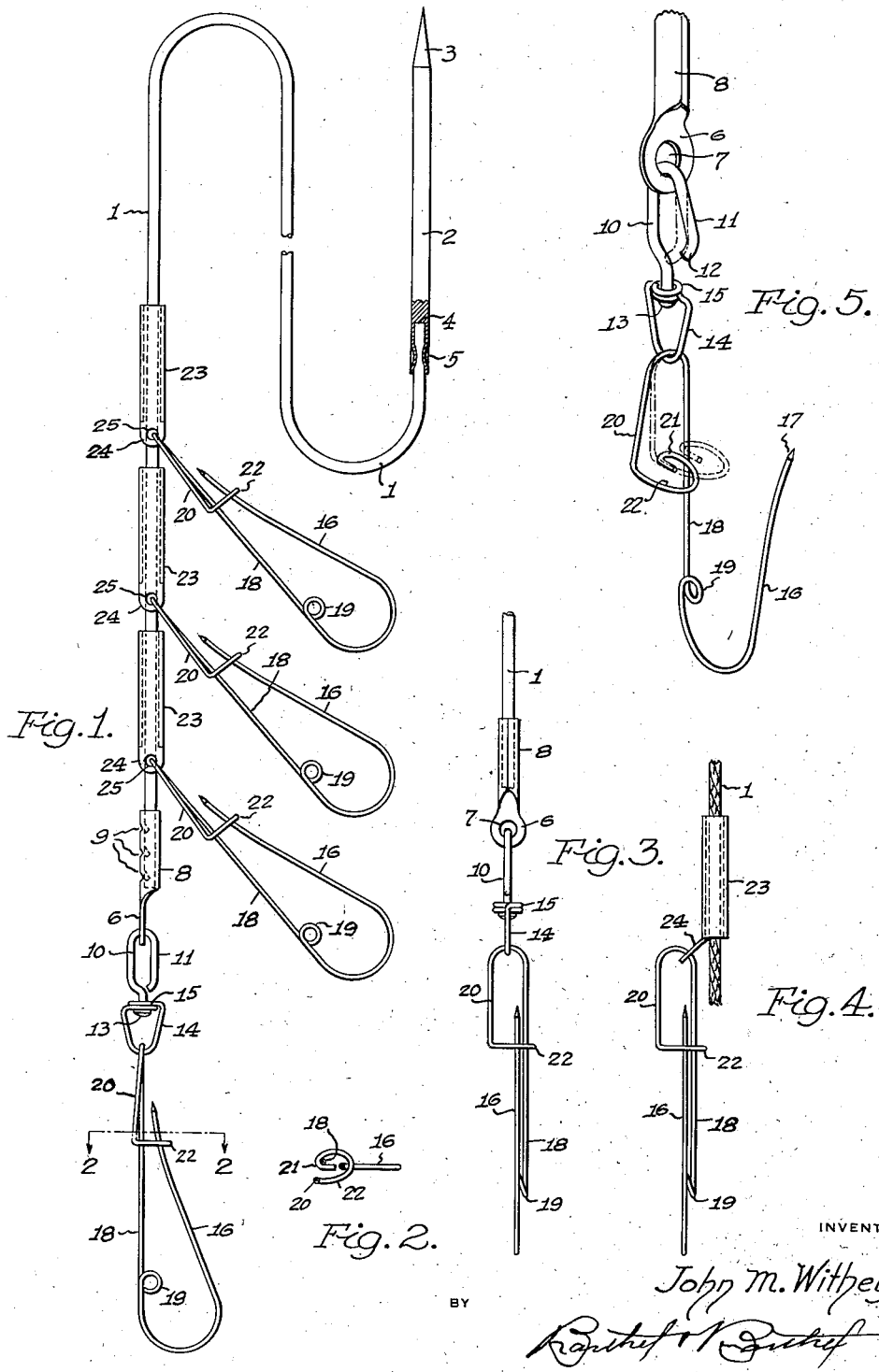
INVENTOR
John M. Withey,
BY
ATTORNEYS Patented Dec. 1, 1936

2,062,386

UNITED STATES PATENT OFFICE 2,062,386

FISH STRINGER

John M. Withey, Howell, Mich., assignor to Leora M. Wickman, Howell, Mich.

Application May 4, 1936, Serial No. 77,817

2 Claims. (Cl. 224—7)

The present invention relates to a fish stringer of a type particularly adapted for holding freshly caught fish in such manner that they may be held captive in the water from which they were removed in order to prolong their lives.

The primary object of the present invention is to provide a fish stringer comprising a cable having detachable means adapted to be hooked through the lips of a fish and then placed upon the stringer whereby the fish may be held captive in the water.

Another object of the present invention is to provide a fish stringer comprising a cord and a series of wire hook members adapted to be hooked through the mouth of a fish and provided with means whereby they may be strung upon the cord after the fish have been hooked thereon, the said stringing means being such that the hook members are supported in spaced apart relation as well as being capable of a freedom of movement which permit the hook members to move with respect to the cord.

With the above and other ends in view the invention is more fully disclosed with reference to the accompanying drawing in which Figure 1 is an elevation;

Fig. 2 is a section taken on the line 2—2 of Fig. 1;

Fig. 3 is an elevation of a detail;

Fig. 4 is an elevation of another detail, and

Fig. 5 is a perspective view of a detail.

Like characters of reference are employed throughout to designate corresponding parts.

The numeral 1 designates a flexible cord and 2 a metallic body having a pointed end 3 and a bore 4 in the end opposite to the pointed end. The end of the cable 1 is inserted within the bore 4 and the side walls are deformed inwardly as indicated at 5 to frictionally engage the end of the cord and hold it with respect to the metal body 2. At its other end the cord is provided with a fitting 6 having an eye 7 and a tubular shaped portion 8 into which the said other end of the cord 1 is inserted. The socket portion 8 has its wall deformed inwardly as indicated at 9 to frictionally engage the end of the cord 1 to hold it with respect to the fitting 6.

Inserted through the eye 7 of the fitting 6 is a swivel part 10 having an arm 11 normally extending oblique to the plane of the part 10 and adapted to be bent inwardly so that its end 12 engages or lies in close proximity to the part 10 after insertion through the eye 7 for the purpose of preventing removal therefrom. In other words the parts 10, 11, and 12 are formed of a single piece of wire bent to form an open loop which after insertion through the eye 7 is bent to form a closed loop so that it remains permanently attached to the fitting 6. The lower end of the part 10 has a head 13 thereon and a wire loop member 14 has its opposite ends bent around the lower portion of the part 10 as indicated at 15. The parts 15 are loosely wrapped around the part 10 so as to permit the loop 14 to swivel with respect to the loop formed of parts 10, 11, and 12. A fish holding member formed of spring wire comprises a hook 16 having a pointed end 17 so that it may be easily forced through the jaws of a fish and is connected to a shank 18 by a spring loop 19. At its upper end the shank 18 has a return bend 20 formed with two keepers 21 and 22 at its lower end. The keepers 21 and 22 and the return bend 20 are threaded through the loop member 14 and the return bend is then sprung toward the shank 18 so that the shank is disposed within the keeper 21. The fish holding member is thus permanently attached to the loop 14 for all intents and purposes although it may be removed if any need for such removal should arise. In use the hook 16 is forced through the upper and lower lips of a fish's mouth and the hook 16 is then sprung into the keeper 22. The fish is thus secured to the fitting 6 through a swivelling connection which permits the fish to move freely about and the means for so connecting it to the fitting 6 permits the fish to use its gills for breathing purposes and thus avoid drowning.

The numeral 23 designates a sleeve having an internal diameter large enough to permit it to be threaded over the metal element 2 on to its cord 1 but small enough that it cannot pass over the tubular portion 8 of the fitting 6. At one end the sleeve has an obliquely disposed prong 24 with an aperture 25 therein. A fish holding element identical to that above described has its return bend 20 threaded through the aperture 25 and sprung into engagement with its respective shank 18 to secure it with respect to the sleeve. The fish are mounted on the hook 16 in the manner above described and due to the fact that the sleeve 23 is loose with respect to the cord 1 it may rotate around the same to permit the held fish a certain amount of freedom. By placing the prongs at the ends of the sleeves 23, as shown, they maintain the several fish holding elements in spaced apart relation and tend to prevent tangling of the stringer due to commotion resulting from the attempts of a plurality of fish to escape.

Although a specific embodiment of the invention has been illustrated and described it will be understood that various changes may be made within the scope of the appended claims without departing from the spirit of the invention and such changes are contemplated.

What I claim is:—

1. In a fish stringer, an elongated cord having a metal needle at one end and a metal retainer with a tubular portion permanently secured to the other end, a sleeve member sleeved on said cord and having an internal diameter smaller than the external diameter of said tubular portion whereby it is retained thereon by said retainer, the end of said retainer providing a bearing for the end of said sleeve to permit free rotation thereof around said cord, said sleeve having an outwardly projecting portion at one end thereof formed with an opening, and a fish holding element having means extending through said opening and retaining it with respect to said sleeve.

2. In a fish stringer, an elongated cord, a retainer at one end of said cord, said retainer having a tubular portion receiving the end of said cord and deformed portions frictionaly securing it to the cord, a plurality of sleeves sleeved on said cord, each sleeve having a projecting portion at one end thereof formed with means for receiving fish retaining members, fish retaining members attached to said means, said plurality of sleeves being adapted to butt one against another to maintain said fish retaining members in spaced apart relation, said sleeves having an internal diameter greater than the cord whereby they are loose with respect thereto whereby to permit freedom of movement of the fish retaining members with respect to said cord, the internal diameters of said sleeves being less than the outer diameter of said tubular portion whereby the lowermost of the series of sleeves finds bearing directly on the end of said tubular portion.

JOHN M. WITHEY.